Figure 1:
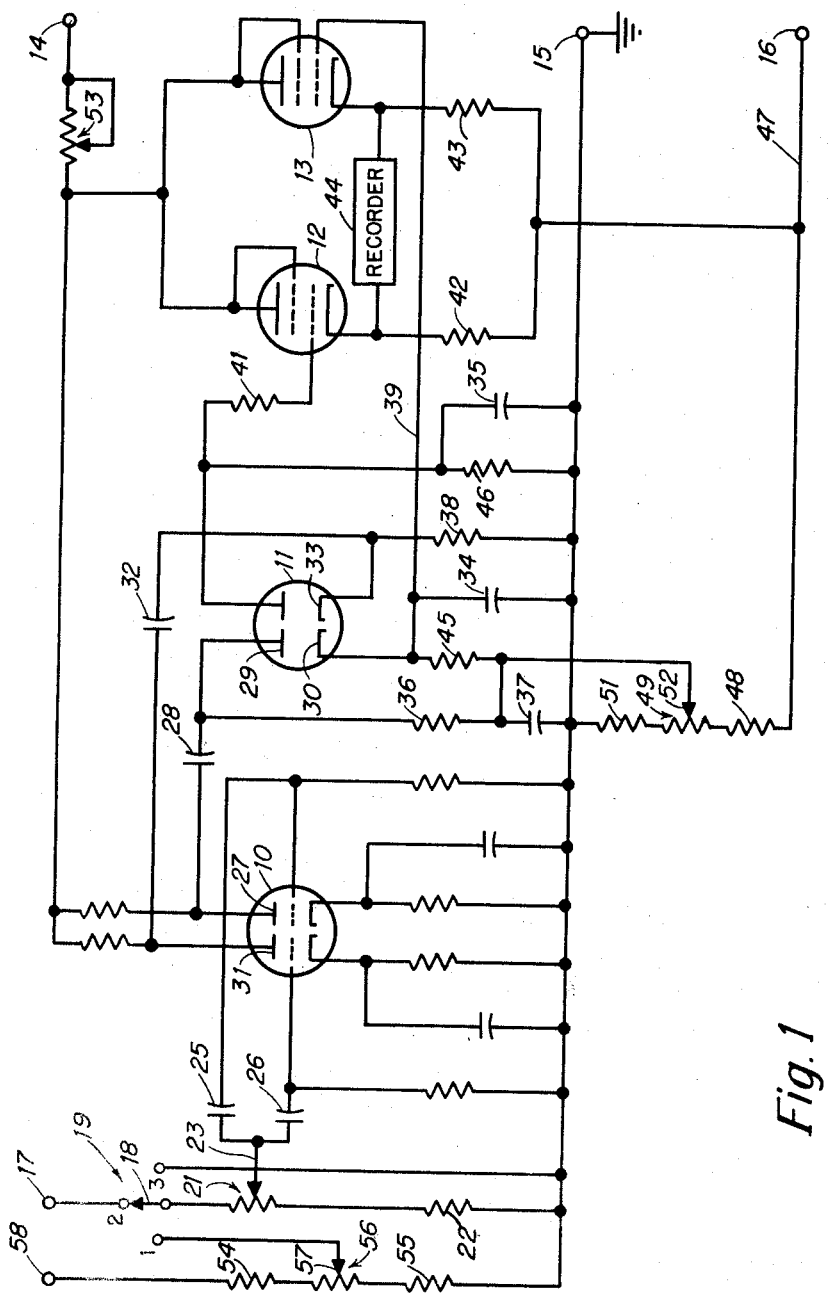

July 21, 1959

C. K. LISLE 2,896,076

DRIVER AMPLIFIER FOR RECORDER

Filed April 21, 1953

2 Sheets-Sheet 2

INVENTOR.
CLAUDE K. LISLE

BY George Sipkin

George E. Pearson
ATTORNEYS

United States Patent Office 2,896,076
Patented July 21, 1959

2,896,076

DRIVER AMPLIFIER FOR RECORDER

Claude K. Lisle, San Diego, Calif.

Application April 21, 1953, Serial No. 350,275

1 Claim. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

This invention relates generally to driver amplifiers for pen recorders and more particularly to a new and improved power amplifier for driving a pen recorder on D.C. voltages in response to A.C. signals.

When the pen recorder to be used is of a type such, for example, as the Brush Development Co. BL 206 Six Channel Magnetic Oscillograph, in which the pen is normally positioned in the center of the recording paper or chart, A.C. signals having low frequencies of the order of sixty cycles per second will give only half scale deflections and it is therefore desirable to operate the recorder on D.C. requirements which are for full scale deflection.

To this end, the principal function of the power amplifier is to provide D.C. voltages for driving the recorder pen motor so as to produce pen deflections proportional to the A.C. signal voltages to be recorded with linear response from zero to maximum signal input. In order to operate the recorder full scale it is necessary to provide a source of negative potential for positioning the pen to one side of the recording paper. For this purpose it is desirable that the power amplifier also function in such a manner as to provide negative bias sufficient to position the pen to one side of the paper, as aforedescribed, for zero signal input.

Under certain recording conditions such, for example, as where equipment including a multi-channel recorder is employed to measure and record a plurality of signals indicative of conditions of a diving submarine such, for example, as depth of water, hull angle, bow plane, and the like, it is essential that weight, bulk and power requirements of the equipment be reduced to a minimum. Consequently, it is desirable that the efficiency of the power amplifier be high, i.e., the current drain per amplifier per channel be low in relation to the power requirement of each channel of the recorder for full scale deflection. It is also desirable that the power drain be constant over the range of minimum to maximum output of the amplifier in order to avoid cross modulation effects between channels which otherwise would result due to power drain fluctuations in the several channels of the recorder equipment.

Where the A.C. signals are rectified to produce the D.C. voltages for driving the recorder, the allowable maximum ripple voltage for satisfactory operation of the recorder becomes a factor which must be considered in providing a suitable driver amplifier therefor. In addition, it sometimes becomes necessary under certain circuit conditions to operate the pen motor without either side thereof being grounded which requires that the application of the D.C. diving voltages to the recorder be at sufficiently low potential with respect to ground as to avoid burning out of the pen motor in the event of shorting of either side thereof to ground.

Impedance matching of the driver amplifier with respect to the impedance of the signal source and with respect to the impedance of the recorder, the response of the amplifier over the frequency range of the signals to be encountered, the critical damping of the recorder, the zero drift of the amplifier, and provisions for zero, calibration and gain adjustments are further factors which must be considered in providing a driver amplifier and recorder of the type hereinbefore considered in order to obtain optimum performance of the pen recorder for the purpose intended.

The foregoing requirements are fulfilled by a driver amplifier constructed in accordance with the principles of the present invention wherein an incoming A.C. signal is first amplified in a dual stage of amplification comprising separate drivers to a pair of rectifier tubes connected back-to-back for rectification of both sides of the amplified signal in reverse polarity. The rectified signals are applied respectively to the grids of a pair of power tubes effectively connected for push pull operation with the recorder connected between the cathodes thereof in a bridge circuit arrangement comprising cathode load resistors whereby the recorder connections are at low potential with respect to ground. A negative power supply voltage is applied to the cathode resistors in order to bias the power tubes for operation of each in the linear portion of its characteristic curve and for optimum power output.

The negative power supply voltage is also utilized to bias the positive rectifier sufficiently to position the pen to one side of the recording paper with no signal input with the result that this rectifier moves in a positive direction with signal. As a result of this arrangement, the grid to cathode potential of one of the power tubes becomes increasingly more negative as the signal increases from zero to full scale deflection of the pen while the grid to cathode potential of the other power tube becomes increasingly less negative, the condition of cathode potentials thus being such that the potential across the pen motor is zero at half scale deflection of the pen and the potential at the cathodes with respect to ground at zero and maximum deflections is sufficiently low to prevent burning of the pen motor in the event of a short thereof to ground.

Damping of the pen recorder is controlled by the time constant of the amplifier resulting from RC networks in the rectifier circuits and being of a value sufficient to provide critical damping. An object of the invention is to provide a new and improved power amplifier for operation of a pen recorder on D.C. voltages in response to A.C. signals from a high impedance source in which the response of the amplifier is linear over the range of signal strengths to be encountered; the frequency response of the amplifier is substantially flat over the range of signal frequencies to be encountered; the efficiency is good, the current drain of the amplifier being low in relation to the power requirements of the pen recorder at full scale deflection; and the total current requirement of the amplifier and recorder being constant from zero to full scale deflection of the pen.

Another object is to provide a power amplifier as aforedescribed in which negative bias for positioning the pen to one side of the recording paper is supplied by the amplifier.

Still another object is to utilize the time constant of the amplifier for providing damping control of the pen motor of the recorder.

A further object is to provide a driver amplifier for an ungrounded pen recorder in which the driving potential applied to the pen motor at center of the scale is zero and in which the potential to ground at either side of the pen motor is at a low non-burn-out potential for zero and full scale deflections of the pen.

Figure 2:
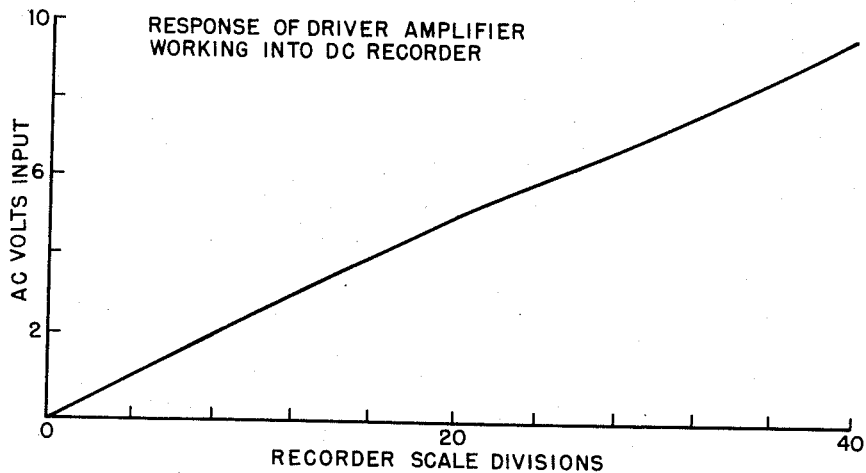
Figure 3:
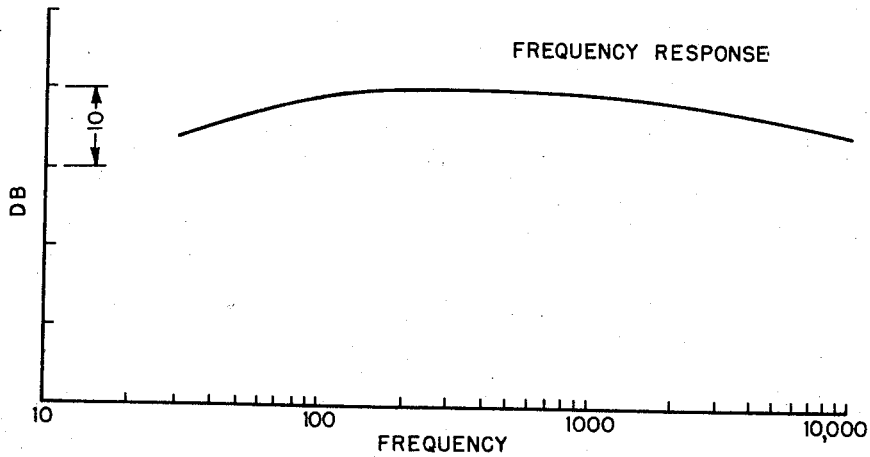

Additional objects, features and advantages of the present invention not expressly hereinbefore set forth are those inherent in or to be implied from the novel combination and arrangement of parts comprising the electronic system and circuitry of the invention for further details and understanding of which reference is now made to the following specification and accompanying drawings which disclose the preferred embodiment of the invention and wherein:

Fig. 1 is a diagrammatic view of the electronic system of the driver amplifier; and Figs. 2 and 3 depict graphs which respectively illustrate the linear response and the frequency response and the frequency response of the amplifier.

Referring to Fig. 1, there is disclosed therein a specific circuit arrangement which has been developed to meet the full scale D.C. requirements of the Brush Development Co. BL 206 Six Channel Recorder, aforementioned, in addition to specific signal source conditions characterized by high impedance and inability to allow any appreciable power drain. While the circuit is well adapted to meet these requirements and it is helpful to an understanding of the invention to describe it in relation thereto, it will be understood by those skilled in the art to which this invention pertains that the usefulness of the invention is not so limited and it is the intention in the claims appended hereto not to so limit the scope of the invention.

The A.C. signals to be recorded are those of the order of five volts or less such, for example, as are derived from small A.C. voltages applied to micro torque pots fastened directly to indicator meters such, for example, as the hull angle indicator, these meters being employed to indicate various conditions encountered in diving a submarine. In accordance with this arrangement, the signal output of each micro torque pot is proportional to the rotation of the hand of the meter individual thereto. Since no power can be taken from a micro torque pot and have linearity, the driver amplifier of Fig. 1 was developed to work into the recorder.

The BL-206 recorder, however, gives only half scale deflections for low frequency A.C. signals and the amplifier therefore has provision for supplying D.C. driving voltages to the recorder proportional to the A.C. signals in order to obtain full scale deflections of the pen. For D.C. requirements, 36 volts positive across 1500 ohms at approximately 24 milliamperes, in the specific case of the BL-206 recorder is required for full scale deflection of the pen and 18 volts negative across the 1500 ohms is required to position the normally centered pen to one side of the recording paper, the optimum source impedance to drive the pen motor being 250 ohms.

The circuit of Fig. 1 comprise a twin-triode amplifier 10, a twin-diode rectifier 11 and two beam power amplifier tubes 12 and 13. These tubes may be of any type suitable for the purpose, tube 10, for example, being a 6SN7, tube 11 being a 6H6, and the power tubes 12 and 13 each being a 6V6. It will be apparent also that single tubes may be employed throughout when this is desired.

Potential of the order of 300 volts D.C. for operating these tubes is applied to terminals 14, 15 and 16, terminal 14 providing the B+ plate supply. Terminal 15 is grounded and serves as B− potential for tubes 10 and 11. Tubes 12 and 13, however, are connected across full potential between terminals 14 and 16. The result of this arrangement is that the B− potential for the power tubes is at a negative potential of about 105 volts with respect to ground, this being for reasons which will become more fully apparent as the description proceeds.

The A.C. signals to be recorded are applied to input terminal 17. When the arm 18 of the selector switch generally designated 19 is in the central position 2 of the switch, the signals are applied to a voltage divider network comprising a gain control potentiometer 21 and resistor 22.

A portion of the signal appearing at wiper 23 of potentiometer 24 is amplified in a conventional dual stage of amplification provided by the tube 10, and its associated circuit elements, the signal voltage being applied to the grids of the tube via the coupling condensers 25 and 26.

The amplified A.C. signal appears at both plates of tube 10 and is rectified by tube 11, one side or half cycle of the signal appearing at one of the plates being rectified by one of the sections of tube 11 and the other half cycle or side of the signal appearing at the other plate of tube 10 being rectified by the other section of tube 11. To this end, plate 27 of tube 10 is coupled by condenser 28 to plate 29 of tube 11 and plate 31 of tube 10 is coupled by condenser 32 to the cathode 33 of tube 11. The rectified signal sides or half cycles appear respectively as D.C. potential on condensers 34 and 35, the arrangement being such that the sections of tube 11 are connected back-to-back and the rectification is with reverse polarity. By this is meant that while the potential or condenser 34 increases in a positive direction with an increase in the A.C. signal, the potential on condenser 35 increases in a negative direction or becomes more negative. Otherwise stated, during the positive half cycle of the A.C. signal on tube 10, rectification of the signal occurs by way of plate 29 of tube 11 and this results in the charging or build up of D.C. potential on condenser 34, which potential is positive with respect to ground. During this half cycle, the potential of cathode 33 is more positive than the potential on its associated plate and, as a consequence, this section of the tube is non-conducting. During the succeeding half cycle of the A.C. signal on tube 10, however, the potential on cathode 33 becomes negative with respect to its associated plate and the resulting current flow charges condenser 35 in a direction to build up D.C. potential thereon which is negative with respect to ground.

Resistor 36 and condenser 37 complete the return or non-rectifying path for the A.C. signal appearing at plate 27 of tube 10 and resistor 38 completes the return or non-rectifying path for the signal appearing at plate 31 of tube 10. Separate drivers comprising the two sections of tube 10 are employed to drive the respective sections of tube 11 in order to avoid any interaction between the rectifier sections which otherwise would be the case if only a single driver were employed.

The D.C. potentials on condensers 34 and 35 are applied by way of conductor 39 and protective resistor 41 to the control grids of power tubes 13 and 12 respectively. These tubes are connected as cathode followers and together with their cathode load resistors 42 and 43 constitute, in a well known manner, a bridge circuit in which the recorder 44 constitutes the center leg or output of the bridge circuit.

By using two diodes and rectfying each half of the sine wave signal input and applying negative voltage proportional to one half of the signal to the control grid of one of the power tubes and positive potential proportional to the other half of the signal to the control grid of the other of the power tubes, as aforedescribed, full value is realized from the input signal voltage with a minimum of current drain for the power bridge tubes. Moreover, it will be apparent that this arangement provides a D.C. current for driving the recorder which is free of objectionable ripple, this being an important factor when the recorder employed is of a type such, for example, as the BL206 recorder, aforementioned, in which the allowable ripple is in the order of .5 percent for D.C. operation.

While connection of the recorder pen motor between the plates of power tubes 12 and 13 might provide a simple and desirable circuit arrangement from the standpoint of permitting choosing of cathode resistors to give variable self bias and choosing of plate load resistors to give maximum power output across the recorder, this arrangement has the disadvantage of placing both sides of the recorder at high potentials above ground, this being of the order of 200 volts for the power supply voltages aforementioned. In the event of either side of the recorder becoming grounded, it is apparent under these conditions that the pen motor would be burned out in the absence of a fuse in the circuit.

Connection of the recorder between the cathodes, as illustrated is desirable from the standpoint of providing operation at safe anti-burn out potentials. The difficulty of obtaining impedance matching with the recorder for this arrangement is obviated by damping derived from within the amplifier through choosing of a time constant sufficient to avoid sudden changes of current through the power tubes, this being accomplished by causing the potential on the grids of the power tubes to change slowly within desired limits in response to sudden changes in the A.C. input signal. The time constant of the circuit of Fig. 1 is controlled by condensers 34 and 35 and their associated resistors 45 and 46 respectively. In the specific case referred to herein, the time constant is in the order of .05 second and provides critical damping. When the time is decreased below critical damping, the pen of the BL 206 recorder overshoots for full scale deflection. When the time constant is increased above critical damping, short time signals do not rise to full amplitude or have little effect on the amplifier. Under operating conditions in which the signal strength may be varied suddenly as when, for example, it is desired to switch signals rapidly at the input, it will be apparent that suitable damping for satisfactory operation of the recorder is required.

Maximum power output of the bridge power tubes requires cathode load resistors of sufficient size to over bias the tubes with self bias. This is accomplished in conventional circuit arrangements by tapping the control grid into the cathode load resistor. This arrangement is not operative in the circuit arrangement of Fig. 1, however, for the reason that this would upset the D.C. grid-driving potentials developed from rectifier 11.

Optimum power output and grid bias conditions are obtained in the instant case by applying the negative potential of terminal 16 to cathode resistors 42 and 43, these resistors being connected to this terminal by conductor 47. The negative potential on this conductor is also utilized by means of the voltage divider network comprising resistor 48, potentiometer 49, and resistor 51 to apply sufficient negative bias to cathode 30 of the tube 11 to position the normally centered pen of the recorder to one side of the recording chart in the absence of any signal input. The required amount of bias is adjusted by adjustment of wiper 52 of potentiometer 49, the wiper being connected to resistor 45 which has no voltage drop thereacross for the no-signal condition.

In response to signals, the rectifier section 29, 30 moves in a positive direction with an increase in signal. The other section including cathode 33, it will be recalled, increases negatively with a signal increase.

In a circuit arrangement having specific values for the various components of Fig. 1, the following table of voltage values were obtained for power tubes 12 and 13:

| Input to amplifier | Grid to cathode bias | | Cathode to ground | | Output across recorder (1,500 Ohms) |
|---|---|---|---|---|---|
| | Tube 12 | Tube 13 | Tube 12 | Tube 13 | |
| No signal input | −10.5 | −21.0 | 9.0 | −9.0 | −18.0 |
| Half scale input | −15.7 | −15.7 | 0 | 0 | 0 |
| Full scale input | −21.0 | −10.5 | −9.0 | 9.0 | −18 |

As may be seen from the table, the grid to cathode excursion is approximately 10.5 volts for full output. Various pen motors will vary and in general will require less output for full scale deflection. The circuit components are so chosen that the actual cathode to ground potential of the power tubes varies approximately from +9 to −9 volts for minimum to maximum drive on the recorder. At mid scale deflection the cathode to ground potential should be zero on both power tubes. As a result, either side of the pen motor should never be more than ±9 volts with respect to ground at either minimum or full scale deflection.

For maximum linearity of the system, the power tubes and their cathode resistors should be matched.

Assuming that these are matched, the plate voltage should be adjusted by adjustment of potentiometer 53 to give zero voltage, cathode to ground potential, on both power tubes when the pen is centered on the chart. This assures that each of the output tubes will swing an equal amount over the linear portion of its characteristic curve in response to signal input and will therefore cancel out any non-linear tube effects.

In setting the amplifier in readiness for operation, the pen is centered on its chart before applying any operating potential. After applying potential of values as aforedescribed to terminals 14, 15 and 16, switch 19 is adjusted to set wiper arm 18 thereof in position 3 of the switch. Potentiometer 49 is then adjusted to set the pen to the extreme left side of the chart, the deflections being to the right.

If a calibration or maximum scale deflection standard signal is desired, switch 19 is adjusted to set wiper arm 18 thereof in position 1 of the switch. In this position of the switch, A.C. potential is applied to the input of the amplifier from a voltage divider network comprising resistors 54 and 55 and a calibrate potentiometer 56, the wiper 57 of which is connected to the contact at position 1 of switch 19. Approximately eight volts R.M.S. is applied between terminal 58 of this network and ground with the result that upon adjustment of gain potentiometer 21 in conjunction with adjustment of calibrate potentiometer 56 the recorder pen may be positioned at full scale deflection. Approximately 2½ volts R.M.S. of input is required for maximum gain of the amplifier at 1000 c.p.s. to give full scale output of the recorder. As may be seen from the curve of Fig. 3, the frequency response of the amplifier is essentially flat from 60 to 6000 cycles per second, this being the frequency response when the circuit of Fig. 1 has the component values referred to hereinbefore in connection with the table of voltages depicting the output of the power tubes.

When the zero and calibration adjustments are completed, switch 19 is set in position 2 thereof for response to all input signals. As may be seen from the input vs. output curve of Fig. 2, the response of the amplifier is approximately a straight line from zero to full scale deflection of the recorder pen.

Obviously many modifications and variations of the present invention are possible in the light of the above teachings. It is therefore to be understood that within the scope of the appended claims the invention may be practiced otherwise than as specifically described.

What is desired to be secured by Letters Patent of the United States is:

In a driver power amplifier for operating a recorder on D.C. voltages in response to A.C. signals received from a high impedance source, an input signal terminal, a ground, a gain control potentiometer connected between said terminal and said ground including a variable voltage pick-off wiper, a first amplifier containing a cathode, a control grid, and a plate, a coupling condenser connected between said first amplifier control grid and said wiper, a resistor connected between the interconnection of said first amplifier grid and said wiper and ground, a resistor and a condenser connected in parallel therewith connected between said first amplifier cathode and said ground, a B+ voltage supply, a variable resistor connected to said B+ voltage to regulate same, a plate resistor connected between the plate of said first amplifier and said variable resistor, a first rectifier including a cathode and a plate, a coupling condenser connected between the plate of said first amplifier and the cathode of said first rectifier, a resistor connected between the cathode of said first rectifier and ground constituting a completion of a non-rectifying path for the A.C. signal appearing at the plate of the first amplifier, a second amplifier including a cathode, a control grid, and a plate, a resistor and a condenser connected in parallel therewith connected between said second amplifier cathode and ground, a plate resistor connected between said second amplifier plate and the aforesaid variable resistor, a coupling condenser connected between said second amplifier grid and the wiper of said gain control potentiometer, a resistor connected between said second amplifier control grid and ground, a second rectifier including a cathode and a plate, a coupling condenser connected between said second rectifier plate and the plate of the aforesaid second amplifier, a resistor and a condenser connected in series connected between the plate of said second rectifier and ground constituting a completion of a non-rectifying path for the A.C. signal appearing at the plate of said second amplifier, a high voltage supply, a voltage divider including a potentiometer containing a wiper connected between said high voltage supply and ground, said wiper being connected to the interconnection of the aforesaid series connected resistor and condenser, a resistor connected between said wiper and the cathode of said second rectifier, a condenser connected between the cathode of said second rectifier and ground, a resistor and condenser connected in parallel therewith connected between the plate of said first rectifier and ground, a first power amplifier including a cathode, a control grid, a supressor grid, and a plate, a resistor connected between the plate of said first rectifier and the control grid of said first power amplifier, a second power amplifier including a cathode, a control grid, a supressor grid, and a plate, the plates of said first and second power amplifiers being connected to B+ voltage thru the aforesaid variable resistor, the plates of said first and second power amplifiers being connected to their respective supressor grids, a resistor connected between the cathode of said first power amplifier and the interconnection between the aforesaid voltage divider and the high voltage supply, a resistor connected between the cathode of said second power amplifier and said high voltage supply, the control grid of said second power amplifier being electrically connected to the cathode of said second rectifier, and recording means responsive to a D.C. potential differential connected between the cathodes of said first and second power amplifiers.

References Cited in the file of this patent

UNITED STATES PATENTS

| | | |
|---|---|---|
| 1,647,711 | Nichols | Nov. 1, 1927 |
| 2,146,723 | Dunham et al. | Feb. 14, 1939 |
| 2,477,962 | Chapin | Aug. 2, 1949 |
| 2,516,672 | Brockman | July 25, 1950 |
| 2,603,779 | Ferrill | July 15, 1952 |
| 2,616,045 | Brubaker | Oct. 28, 1952 |
| 2,677,015 | Hausman | Apr. 27, 1954 |
| 2,763,838 | McConnell | Sept. 18, 1956 |